(12) United States Patent
Kato

(10) Patent No.: US 8,016,442 B2
(45) Date of Patent: Sep. 13, 2011

(54) ILLUMINATED INDICATING DEVICES FOR INSTRUMENT PANELS

(75) Inventor: Takahira Kato, Novi, MI (US)

(73) Assignee: DENSO International America, Inc., Southfield, MI (US)

( * ) Notice: Subject to any disclaimer, the term of this patent is extended or adjusted under 35 U.S.C. 154(b) by 355 days.

(21) Appl. No.: 12/360,629

(22) Filed: Jan. 27, 2009

(65) Prior Publication Data

US 2010/0188835 A1 Jul. 29, 2010

(51) Int. Cl.
*G01D 11/28* (2006.01)

(52) U.S. Cl. .............................. 362/30; 362/26

(58) Field of Classification Search .............. 362/26–30
See application file for complete search history.

(56) References Cited

U.S. PATENT DOCUMENTS

| 2,664,849 | A | * | 1/1954 | Nallinger | 116/62.1 |
|---|---|---|---|---|---|
| 4,625,262 | A | * | 11/1986 | Sakakibara et al. | 362/26 |
| 6,032,608 | A | * | 3/2000 | Oreans et al. | 116/288 |
| 6,409,355 | B1 | * | 6/2002 | Simon et al. | 362/23 |
| 6,863,411 | B2 | * | 3/2005 | Furuya | 362/23 |
| 7,108,531 | B2 | | 9/2006 | Kato | |
| 7,275,497 | B2 | | 10/2007 | Kato | |
| 7,404,374 | B2 | | 7/2008 | Kato | |
| 2006/0185576 | A1 | * | 8/2006 | Tane | 116/288 |
| 2007/0035960 | A1 | * | 2/2007 | Birman et al. | 362/489 |

* cited by examiner

*Primary Examiner* — Julie Shallenberger
(74) *Attorney, Agent, or Firm* — Harness, Dickey & Pierce, PLC

(57) ABSTRACT

An illuminated indicating device includes a dial plate, a pointer, a first light source, a light guide and a light filter. The first light source emits a beam of light and the light guide diverts the beam of light into a first light to the pointer and a second light to a front side of the dial plate. The light filter includes a first filtering portion and a second filtering portion. The first filtering portion is located in a path of the first light to allow a first color of light to pass through and the second filtering portion is located in a path of the second light to allow a second color of light to pass through.

14 Claims, 4 Drawing Sheets

ILLUMINATED INDICATING DEVICES FOR INSTRUMENT PANELS

FIELD

The present disclosure relates to illuminated indicating devices for instrument panels for motor vehicles. More particularly, the present disclosure relates to illuminated indicating devices with light guides for improved illumination.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An illuminated indicating device, such as a speedometer of a motor vehicle, typically includes a display surface, a light source, and a light guide therebetween. The light guide guides the light from the light source located at a rear side of the indicating device to the display surface to make the indicia on the display surface visible. A pointer located adjacent to the display surface may also be illuminated.

SUMMARY

An illuminated indicating device according to the teachings of the present disclosure includes a dial plate that includes a display surface and a rear side, a pointer, a first light source, a light guide and a light filter. The first light source is disposed at the rear side of the dial plate to emit a beam of light. The light guide diverts the beam of light into a first light to the pointer and a second light to the display surface of the dial plate. The light filter includes a first filtering portion and a second filtering portion. The first filtering portion is located in a path of the first light to allow a first color of light to pass through. The second filtering portion is located in a path of the second light to allow a second color of light to pass through.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
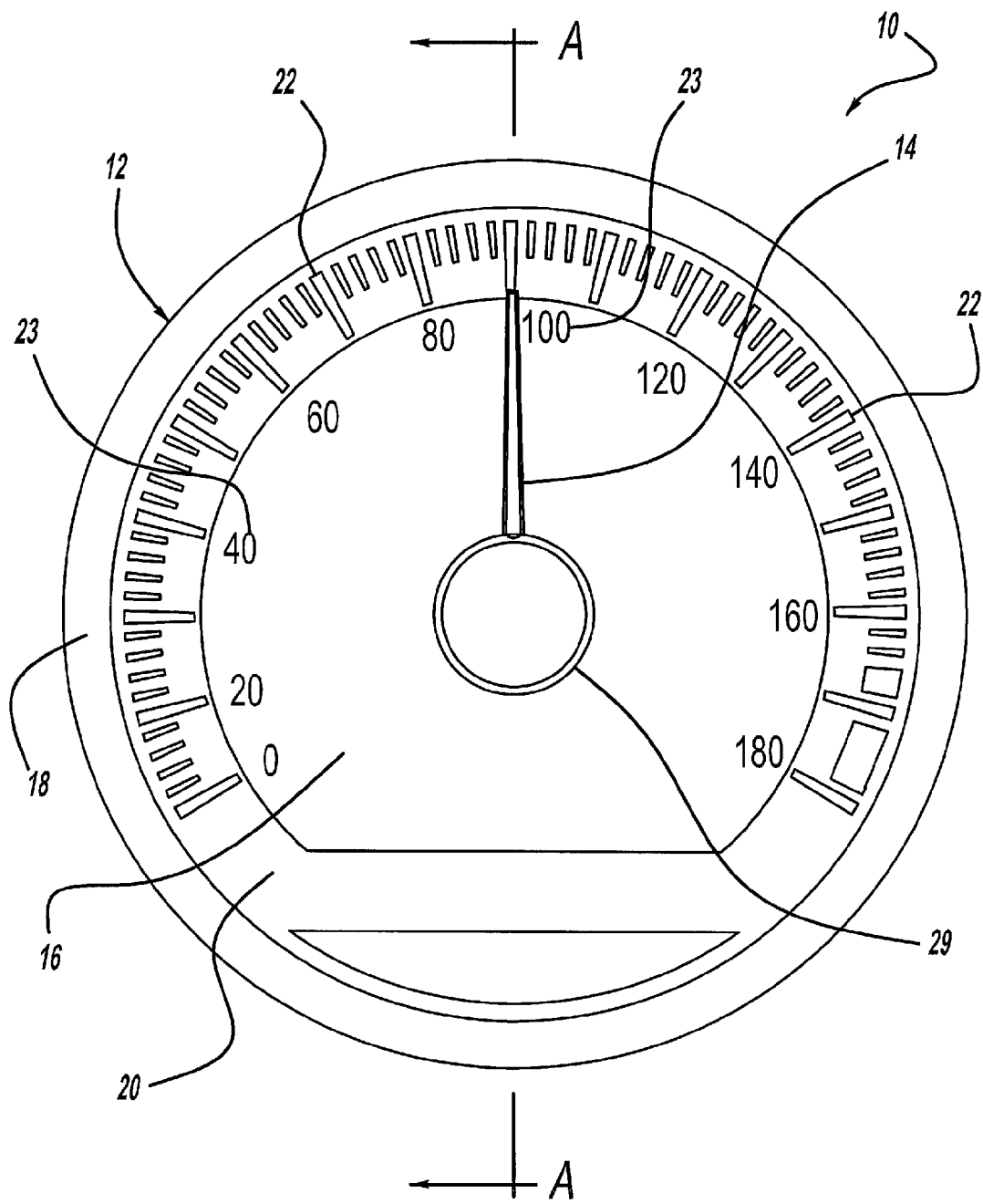
FIG. 1 is a front view of an illuminated indicating device according to the teachings of the present disclosure.
Figure 2:
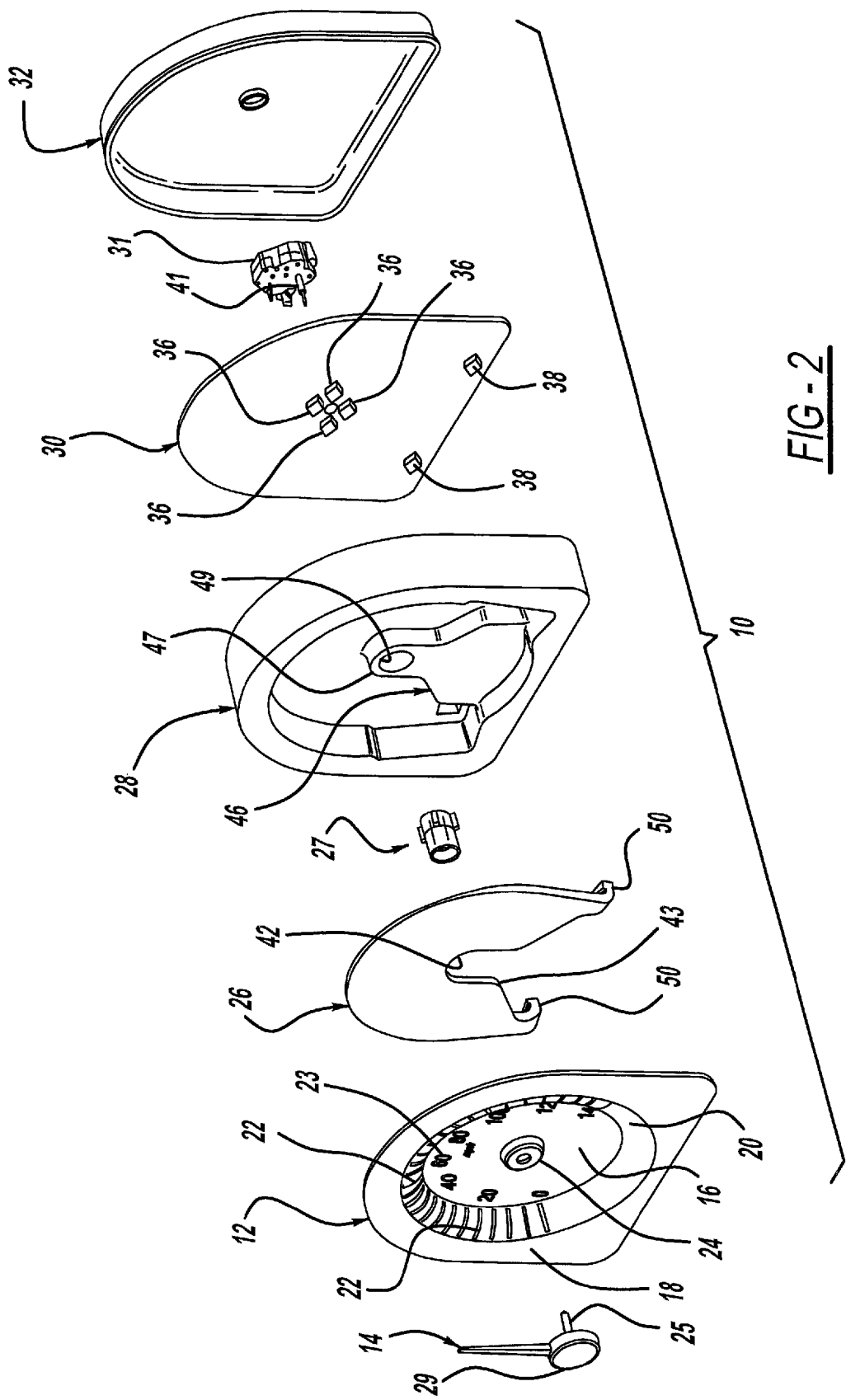
FIG. 2 is an exploded view of an illuminated indicating device according to the teachings of the present disclosure.

The following description is merely exemplary in nature and is in no way intended to limit the disclosure, its application, or uses. For purposes of clarity, the same reference numbers will be used in the drawings to identify similar elements. Referring first to FIGS. 1 and 2, an illuminated indicating device 10 in the illustrative example is a speedometer for an automobile; however, those skilled in the art will understand and appreciate that the illuminated indicating device 10 may be used in control panels or instrument panels in applications other than automobiles.

The illuminated indicating device 10 includes a dial plate 12 and a pointer 14. The dial plate 12 includes a front side (i.e., a display surface) facing a viewer and a rear side opposite to and facing away from the front side. The display surface includes a recessed surface 16, an outer peripheral surface 18, which may be a complete circle around the recessed surface 16, and a curved surface 20 therebetween. The outer peripheral surface 18 may be raised from the recessed surface 16 towards the viewer. A suitable material for the dial plate includes, but is not limited to, polycarbonate (PC).

Indication marks may include gradations 22 formed on the curved surface 20 and indicia or numbers 23 formed on the recessed surface 16. The numbers 23 in the illustrative example denote miles per hour (MPH). The gradations 22 and numbers 23 may be formed on the dial plate 12 by a translucent material to permit backlighting to be seen by a viewer looking at the front side of the dial plate 12. The gradations 22 and numbers 23 may become visible when light emitted from the rear side of the dial plate 12 passes through the gradations 22 and numbers 23. A light filter 24 is provided at the center of the dial plate 12 and protrudes from the recessed surface 16. The pointer 14 is disposed adjacent to the display surface of the dial plate 12 and includes a pointer shaft 25 and a central portion 29. The central portion 29 is provided above the light filter 24.

The illuminated indicating device 10 further includes a transmitting plate 26, a light guide 27, a front housing 28, a printed circuit board ("PCB") 30, a drive unit 31, and a rear housing 32. The PCB 30 includes first light emitting diodes ("LED") 36 at a center of the PCB 30 and second LEDs 38 along an edge of the PCB 30. The PCB 30 is disposed between the front housing 28 and the rear housing 32. The drive unit 31, which may be an electric motor, may be disposed between the PCB 30 and the rear housing 32 and includes a drive shaft 41. The drive shaft 41 protrudes through the PCB 30 to engage the pointer shaft 25 of the pointer 14. The drive unit 31 drives the pointer 14 to an appropriate position indicating a vehicle condition (i.e., vehicle speed in the illustrative example).

The front housing 28 may include a raised portion 46, which may include a central portion 47 that defines a hole 49. The central portion 47 is a type of a raised peninsula that is surrounded by a lower level plain of material. The transmitting plate 26 may be disposed between the dial plate 12 and the front housing 28. The transmitting plate 26 may be made from a translucent material and have a central cutout portion 42 and a side cutout portion 43. The central cutout portion 42 and the side cutout portion 43 jointly define a shape similar to a shape of the raised portion 46 of the front housing 28.

The transmitting plate 26 may include two extensions 50 or protrusions provided adjacent to the side cutout portion 43 and extend rearwardly toward the front housing 28. The extensions 50 may be in the shape of hooks. When assembled, the extensions 50 are aligned with the second LEDs 38. Light emitted from the second LEDs 38 enters the transmitting plate 26 through the extensions 50. A portion of the light leaves the transmitting plate 26 without reflection. Another portion of the light is reflected in and through the transmitting plate 26 towards all portions of the transmitting plate 26, such as to an end of the transmitting plate 26 distal of the extensions 50 and thereafter leaving the transmitting plate 26. When the light leaves the transmitting plate 26, the light passes through the gradations 22 and numbers 23 and makes the gradations 22 and numbers 23 visible.

Figure 3:
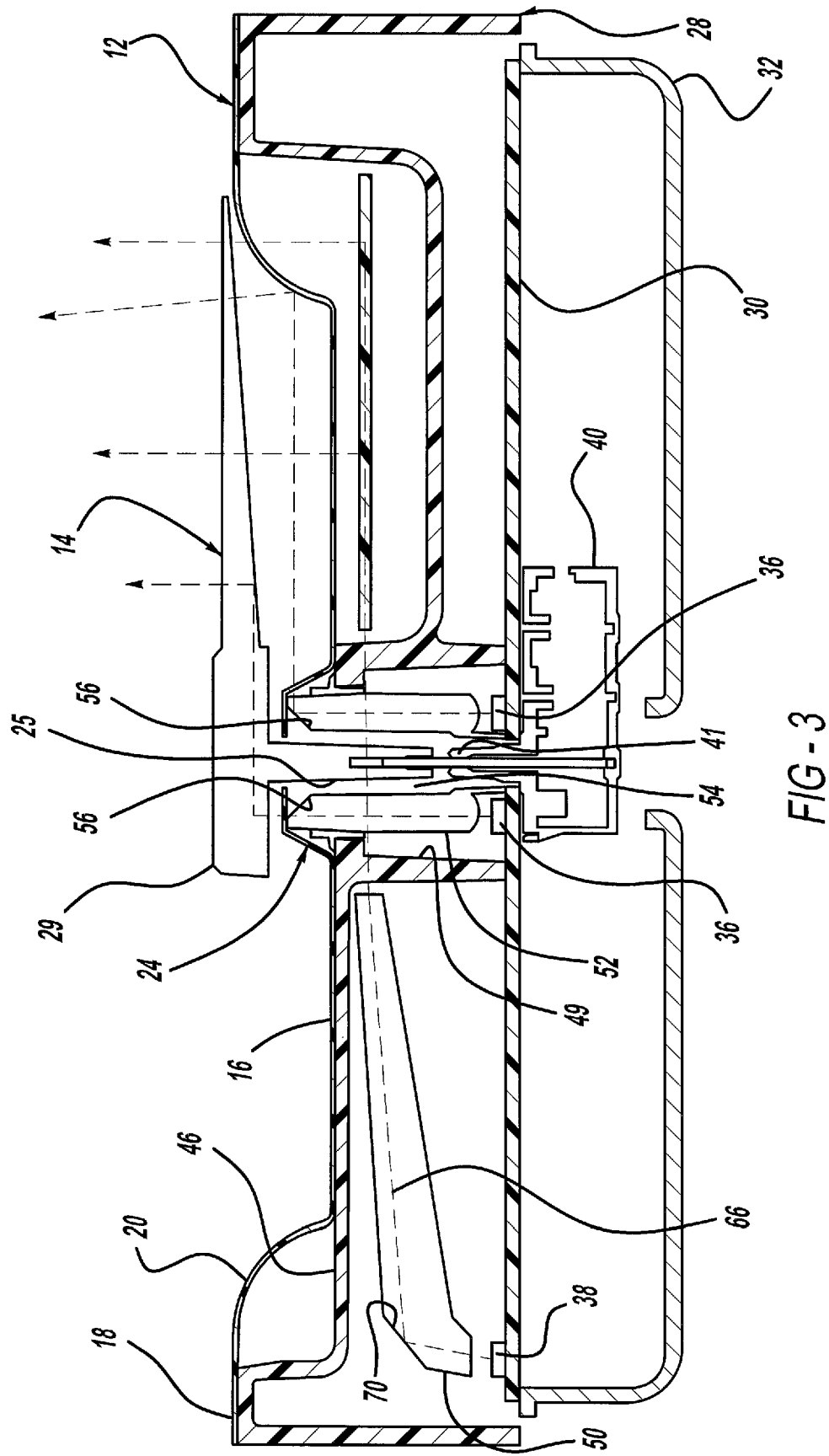
FIG. 3 is a cross-sectional view of an illuminated indicating device taken along line A-A of FIG. 1.
Figure 4:
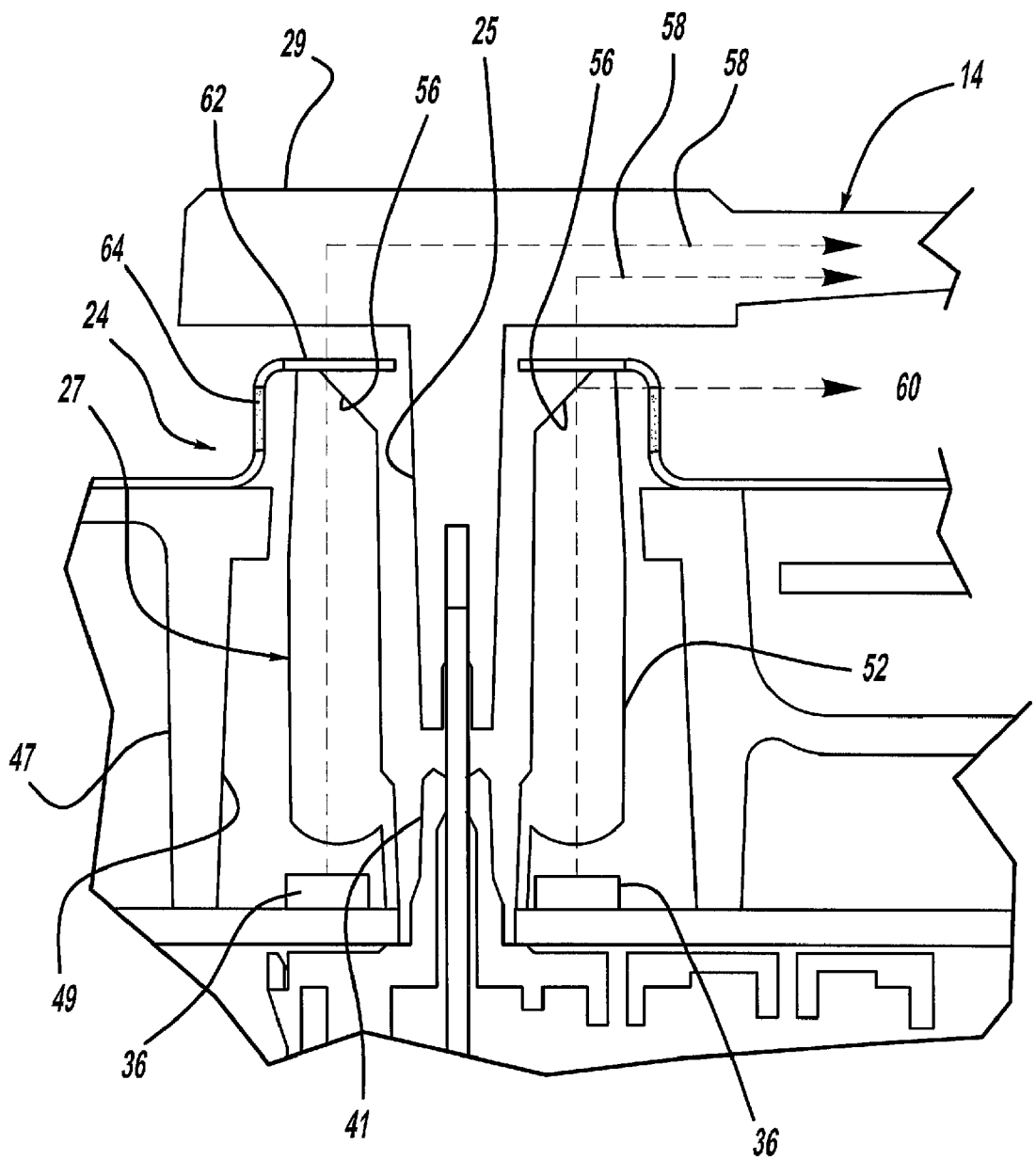
FIG. 4 is an enlarged cross-sectional view of a central portion of an illuminated indicating device according to the teachings of the present disclosure.

With reference now including FIGS. 3 and 4, the light guide 27 defines a cylindrical shape and includes a cylindrical wall 52 that may create an internal hollow with space therein. The light guide 27 may be a lens or prism and is inserted into the central cutout portion 42 of the transmitting plate 26 and the hole 49 in the front housing 28. The light guide 27 may be disposed under and beside the light filter 24. When assembled, the first LEDs 36 may be positioned under, or at an end of the cylindrical wall 52 and align with the cylindrical wall 52 so as to direct light directly into the cylindrical wall 52. The pointer shaft 25 may be inserted into the hollow space, which may be defined by the light guide 27, where the pointer shaft 25 may reside, and engages the drive shaft 41 of the drive unit 31. The cylindrical wall 52 includes a circular chamfered surface 56 at a longitudinal end adjacent to the pointer 14. The chamfered surface 56 protrudes from the recessed surface 16 so at to be closer to the central portion 29 than the recessed surface 16.

Light emitted from the first LEDs 36 is directed into the cylindrical wall 52 of the light guide 27 and reaches the chamfered surface 56. The chamfered surface 56 allows a first portion of light ("first light") 58 to pass straight through unobstructed to enter the pointer 14 and diverts a second portion of the light ("second light") 60 to travel radially through the cylindrical wall 52 towards the curved surface 20 (FIG. 3) of the dial plate 12.

The first light 58 enters the pointer 14 and travels longitudinally through the length of the pointer 14 and through its thickness, or that portion of the pointer that is perpendicular to the recessed surface 16. As such, the first light 58 illuminates the pointer 14. The second light 60 travels radially from a center of the dial plate 12, along and above the recessed surface 16, to the curved surface 20 of the dial plate 12. At the curved surface 20, the second light 60 is reflected toward the sightline of a viewer or the position of a viewer. The second light 60 becomes a flood light that illuminates the display surface or front side of the dial plate 12, which reveals the pointer 14 and numbers 23.

As depicted in FIG. 4, the light filter 24 may be located adjacent to the chamfered surface 56 of the light guide 27. The light filter 24 may be formed integrally with the dial plate 12 or may be a separate element from the dial plate 12. The light filter 24 has a top wall 62 between the central portion 29 of the pointer 14 and the chamfered surface 56, and a side wall 64 surrounding the chamfered surface 56. The top wall 62 may be parallel to the recessed surface 16 and have a hole through which the pointer shaft 25 protrudes. Additionally, the side wall 64 is a supporting wall to the top wall 62 and may be perpendicular to the top wall 62 and the recessed surface 16. The top wall 62 and the side wall 64 may have coatings of different colors to provide specific visual effects. As such, a first filtering portion is formed on the top wall 62 and a second filtering portion is formed on the side wall 64. The first filtering portion allows a first color of light to pass through while the second filtering portion allows a second color of light to pass through.

For example, the top wall 62 may have a light-blue-color coating and the side wall 64 may have a medium-blue-color coating. After the first light 58 travels through the top wall 62, the first light 58 becomes light-blue as it travels into and through the pointer 14. The pointer 14 is thus illuminated by a light-blue light. After the second light 60 passes through the side wall 64 of the light guide 27, the second light 60 becomes medium-blue. Therefore, the display surface of the dial plate 12 is illuminated by a medium-blue light. Continuing, a circular medium-blue light ring may appear along the curved surface 20 of the dial plate 12 as the second light 60 is projected on the curved surface 20 and then reflected by the curved surface 20. The circular light ring along the curved surface 20 creates a three-dimensional appearance on the display surface of the dial plate 12. A medium-blue light halo may also appear around the light filter 24 and consequently a central portion of the pointer 14. Therefore, the first LEDs 36 of the same color create different light features on the dial plate 12 and the pointer 14 (i.e., different colors in dial plate 12 and pointer 14, circular light ring along the curved surface 20 of the dial plate 12, and halo around the central portion 29 of the pointer 14). While the illustrative example shows four first LEDs 36, only one first LED 36 may be used to illuminate the pointer 14 and the display surface of the dial plate 12 to create different light features. Thus, instead of using multiple LEDs of different colors, the present teachings are efficient regarding use of LED lighting in a single color.

It is understood and appreciated that one of the first filtering portion and the second filtering portion may be translucent (i.e., without any coating) to allow all colors of light to pass through. Therefore, the first light 58 or the second light 60 may have the same color as the first LEDs 36.

Alternatively, the light filter 24 may be formed on the light guide 27 as a single piece. For example, the chamfered surface 56 and/or the adjacent top surface of the light guide 27 in the first light path may have a coating of a first color or may be translucent to form the first filtering portion. An outer surface of the cylindrical wall 52 in the second light path may have a coating of a second color or may be translucent to form the second filtering portion.

Referring again to FIG. 3, light emitted from the second LEDs 38 enters the transmitting plate 26. The light from the LEDs 38 is a third light 66 that enters the transmitting plate 26 through the extensions 50, which may protrude or pass through the front housing 28 to lie close to the LEDs 38, with no obstructions between the LEDs 38 and the extensions 50. The third light 66 is reflected inside the transmitting plate 26 by a chamfered surface 70 and travels across and through the transmitting plate 26 toward an end distal of the extensions 50, including the entire curved surface of the transmitting plate 26. As the third light 66 leaves the transmitting plate 26 toward a rear side of the dial plate 12, the gradations 22 and numbers 23, which may be of an opaque material, are illuminated. The second LEDs 38 may have a color (e.g. white color) different from the colors of the first light 58 and the second light 60. With the third light 66 at the rear side of the dial plate 12, the gradations 22 and the numbers 23 are visible to the viewer.

The illuminated indicating device 10 of the present disclosure has improved color contrast on the display surface of the dial plate 12 using a fewer number of colored LEDs and creates a three-dimensional appearance on the display surface for the advantage of more pleasing viewing and quicker identification of speed and other engine or vehicle information by the vehicle driver. For example, the pointer 14 may be illuminated by a first colored light using light from the first LEDs 36. The light from the first LEDs 36 is also used as a flood light for the display surface of the dial plate 12, but in a second color. The gradations 22 and the numbers 23 may be illuminated by a third colored light by using the second LEDs 38. Moreover, additional light features are formed on the display surface of the dial plate 12, such as a circular colored light ring along the curved surface 20 of the dial plate 12 and a circular halo around the central portion of the pointer 14. These additional light features improve illumination appearance, illumination quality (e.g. brightness and color differentiation), make the indication marks and pointer more discernible (e.g. better contrast), and discernible in a shorter time period compared to traditional, conventional gauges.

As disclosed above, with reference to FIGS. 1-4, a vehicle indicating device may employ a dial plate 12 including a front side, which may be viewable by a viewer, and a rear side, which may face the position of a light source 36. The rear side may be opposite to the front side, which is typically viewable by a driver, and the front side may further employ a recessed portion 16 surrounded by an outer peripheral surface 18. A first light source 36, such as an LED, may be disposed on the printed circuit board 30 and be adjacent to the rear side of the dial plate 12 to emit a beam of light away from the printed circuit board 30. A circular light filter protruding portion 24 may protrude from the geometric center of the recessed portion 16 of the dial plate 12. The circular light filter 24 may include a first filtering portion 62 at a flat or top wall 62 of the protruding portion and a second filtering portion 64 at a circular side wall 64 of the protruding portion. The first filtering portion 62 may be positioned at ninety degrees to the second filtering portion 64. A cylindrical light guide 27 may be disposed directly between the first light source 36 and the flat wall 62. A pointer 14 or pointer shaft 25 may be positioned in the center of the circular light filter protruding portion 24 and the center of the cylindrical light guide 27 such that the cylindrical light guide 27 diverts the beam of light into a first light 58 along a longitudinal direction within the light guide 27 and into the pointer 14 to illuminate the pointer 14, and a second light at an angle relative to the first light.

The second light 60 is directed to travel radially from a center of the dial plate 12 toward a periphery of the dial plate. The second light 60 may illuminate a display surface, such as where the numerals are, of the dial plate, and a curved surface 20 adjoining the recessed surface 16 and the outer peripheral surface 18. A second light source 38 may be disposed on the printed circuit board 30. An opaque transmitting plate 26 may be disposed between the light guide 27 and the dial plate 12, the transmitting plate 26 may define a central cutout portion 42 to receive the light guide 27. The transmitting plate 26 may be located adjacent to the rear side of the dial plate 12. The transmitting plate 26 may further employ a plurality of extensions 50, each with a chamfered surface 70. The extensions 50 may protrude away from the dial plate 12 and toward the second light source 38. Light from the second light source 38 may entering the transmitting plate 26 through the extensions 50 and be reflected by the chamfered surfaces 70 to travel toward all peripheral edges of the transmitting plate 26. Light 60 projected from the first light source 36 may be projected onto the curved surface 20, which joins the outer peripheral surface 18 and the recessed surface 16. A circular light ring may be generated along the curved surface 20 when the second light 60 is projected on the curved surface 20. The light emitted from the second light source 38 illuminates indication marks on the dial plate 12 from the rear side of the dial plate 12 by illuminating the transmitting plate 26, which may be opaque, clear or otherwise transmit light.

Those skilled in the art will appreciate from the foregoing description that the broad teachings of the disclosure may be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An illuminated indicating device comprising:
   a dial plate including a front side and a rear side, the rear side opposite to the front side;
   a first light source disposed adjacent to the rear side of the dial plate to emit a beam of light;
   a light guide for diverting the beam of light into a first light along a longitudinal direction of the light guide and a second light at an angle relative to the first light;
   a light filter that includes a first filtering portion and a second filtering portion, wherein the first filtering portion is located in a path of the first light to allow a first color of light to pass through the first filtering portion and the second filtering portion is located in a path of the second light to allow a second color of light to pass through the second filtering portion; and
   a transmitting plate disposed adjacent to the rear side of the dial plate and a second light source that emits light to the transmitting plate; wherein
   the light emitted from the second light source illuminates indication marks on the dial plate from the rear side of the dial plate, and
   the transmitting plate includes an extension and a chamfered surface, the light from the second light source entering the transmitting plate through the extension and being reflected by the chamfered surface to travel toward an end of the transmitting plate distal of the extension.

2. The illuminated indicating device of claim 1 further comprising a pointer wherein the first light enters the pointer to illuminate the pointer.

3. The illuminated indicating device of claim 1 wherein the second light is directed to travel radially from a center of the dial plate toward a periphery of the dial plate.

4. The illuminated indicating device of claim 3 wherein the second light illuminates a display surface of the dial plate.

5. The illuminated indicating device of claim 4 wherein the display surface is disposed at the front side of the dial plate and includes a recessed surface, an outer peripheral surface around the recessed surface, and a curved surface between the recessed surface and the outer peripheral surface.

6. The illuminated indicating device of claim 5 wherein the second light is projected on the curved surface.

7. The illuminated indicating device of claim 6 wherein a circular light ring is generated along the curved surface when the second light is projected on the curved surface.

8. The illuminated indicating device of claim 1 wherein the light filter is disposed between the light guide and a pointer.

9. The illuminated indicating device of claim 8 wherein the light filter is integrally formed with the dial plate.

10. The illuminated indicating device of claim 8 wherein the light filter protrudes from a display surface of the dial plate.

11. The illuminated indicating device of claim 1 wherein the light filter is formed on the light guide.

12. A vehicle indicating device comprising:
    a dial plate including a front side and a rear side, the rear side opposite to the front side, the front side further comprising a recessed portion surrounded by an outer peripheral surface;
    a printed circuit board;
    a first light source disposed on the printed circuit board and adjacent to the rear side of the dial plate to emit a beam of light;

a circular light filter protruding portion that protrudes from the geometric recessed portion of the dial plate, the circular light filter including a first filtering portion on a flat wall of the protruding portion and a second filtering portion on a circular side wall of the protruding portion, the first filtering portion positioned at ninety degrees to the second filtering portion;

a cylindrical light guide disposed directly between the first light source and the flat wall; and a pointer positioned in the center of the circular light filter protruding portion and the center of the cylindrical light guide, wherein the cylindrical light guide diverts the beam of light into a first light along a longitudinal direction within the light guide and into the pointer to illuminate the pointer and a second light at an angle relative to the first light; wherein the second light is directed to travel radially from a center of the dial plate toward a periphery of the dial plate, the second light illuminates a display surface of the dial plate, and the dial plate further comprises:

a curved surface adjoining the recessed surface and the outer peripheral surface.

13. The vehicle indicating device of claim 12 further comprising:

a second light source disposed on the printed circuit board;

an opaque transmitting plate disposed between the light guide and the dial plate, the transmitting plate defining a central cutout portion to receive the light guide, the transmitting plate located adjacent to the rear side of the dial plate, the transmitting plate further comprising:

a plurality of extensions with chamfered surfaces, the extensions protruding away from the dial plate and toward the second light source, light from the second light source entering the transmitting plate through the extensions, the light entering the transmitting plate being reflected by the chamfered surfaces to travel toward an end of the transmitting plate distal of the extensions.

14. The vehicle indicating device of claim 13 wherein:

the second light is projected onto the curved surface, a circular light ring is generated along the curved surface when the second light is projected on the curved surface, the light emitted from the second light source illuminates indication marks on the dial plate from the rear side of the dial plate via the transmitting plate.

\* \* \* \* \*